(12) United States Patent
McBride

(10) Patent No.: US 9,634,303 B2
(45) Date of Patent: Apr. 25, 2017

(54) BATTERY EXTENSION AND WALL MOUNT BOX FOR A SMOKE DETECTOR

(71) Applicant: Frank McBride, Perryville, MD (US)

(72) Inventor: Frank Arthur McBride, Perryville, MD (US)

( * ) Notice: Subject to any disclaimer, the term of this patent is extended or adjusted under 35 U.S.C. 154(b) by 0 days.

(21) Appl. No.: 15/045,204

(22) Filed: Feb. 16, 2016

(65) Prior Publication Data

US 2016/0336560 A1    Nov. 17, 2016

Related U.S. Application Data

(60) Provisional application No. 62/161,816, filed on May 14, 2015.

(51) Int. Cl.
*G08B 21/00* (2006.01)
*H01M 2/10* (2006.01)
*G08B 17/10* (2006.01)

(52) U.S. Cl.
CPC ........... *H01M 2/1033* (2013.01); *G08B 17/10* (2013.01)

(58) Field of Classification Search
CPC .... G08B 17/10; G08B 17/113; G08B 29/145; H01M 2/1033
USPC .......................................................... 340/628
See application file for complete search history.

(56) References Cited

U.S. PATENT DOCUMENTS

| | | | |
|---|---|---|---|
| 5,594,422 A | 1/1997 | Huey et al. | |
| 2005/0099312 A1 | 5/2005 | Blanche | |
| 2005/0128094 A1 | 6/2005 | Howell | |
| 2007/0069153 A1* | 3/2007 | Pai-Paranjape | H01M 2/1066 250/461.1 |
| 2011/0121951 A1* | 5/2011 | Yao | H01M 2/34 340/10.42 |
| 2013/0040179 A1* | 2/2013 | Lenkszus | G08B 29/181 429/99 |
| 2013/0069658 A1* | 3/2013 | Rich | G01R 31/3606 324/426 |

* cited by examiner

*Primary Examiner* — Mark Rushing
(74) *Attorney, Agent, or Firm* — Neifeld IP Law, PC

(57) ABSTRACT

The invention provides a faux battery for a real battery in a smoke detector, and electrically connects the faux battery to a real battery in a reachable battery housing located within reach of a human, to facilitate battery changing in the smoke detector.

7 Claims, 2 Drawing Sheets

BATTERY EXTENSION AND WALL MOUNT BOX FOR A SMOKE DETECTOR

CROSS REFERENCE TO RELATED APPLICATIONS

This application claims the benefit of provisional application 62161816 filed May 14, 2015; this application incorporates by reference in its entirety the disclosure of provisional application 62161816.

FIELD OF THE INVENTION

This invention relates to smoke detectors.

BACKGROUND

Smoke detectors often include batteries as backups to power provided by wiring. Every few years, the battery of a smoke detector needs to be replaced. Smoke detectors are typically installed near the ceiling of a room. A smoke detector installed near the ceiling of a room is often sufficiently high above the floor of the room that the smoke detector is beyond the reach of a human being.

United States patent application publication 20050128094 discloses a "Lowerable smoke detector" (title). United States patent application publication 20050099312 discloses a "Smoke detector with battery pack" (title). U.S. Pat. No. 5,594,422 discloses a "Universally accessible smoke detector" (title).

SUMMARY OF THE INVENTION

My invention provides an method and an apparatus that makes replacement of a battery for a smoke detector more convenient, without requiring any redesign of the smoke detector. This allows individuals that have a disability or are physically challenged to replace the 9 volt battery for the smoke detector by extending the battery compartment to a convenient location to access the battery.

My invention provides a method of use comprising installing a smoke detector in a wall or ceiling of a room of a building. Inserting a faux battery having a positive and a negative electrical wire into the battery housing of the smoke detector such that the positive and the negative electrical wires are each connected to one of the positive and negative terminals of the battery housing; mounting a reachable battery housing to a wall of the room of the building at a location that is within reach of an average human being; connecting the positive and the negative electrical wires to the positive and the negative terminals of the reachable battery housing; and installing a battery in the reachable battery housing, and wherein the reachable battery housing and the battery housing of the smoke detector are designed to house and make electrical contacts to terminals of the same configuration of battery as one another.

My invention provides an apparatus or a combination of interrelated parts, comprising:
(1) a faux battery;
(2) a first wire;
(3) a second wire;
wherein the first wire is mechanically connected or designed to be mechanically connected to the faux battery;
wherein the second wire is mechanically connected or designed to be mechanically connected to the faux battery;
wherein the faux battery is designed to fit into a smoke detector battery housing inside of a smoke detector housing, instead of a battery for which the smoke detector battery housing is designed, such that, (a) the first wire is conductively connected to a first terminal of the smoke detector battery housing when the first wire is mechanically connected to the faux battery and (b) the second wire is conductively connected to a second terminal of the smoke detector battery housing when the second wire is mechanically connected to the faux battery;
(4) a reachable battery housing designed to connect to a battery designed to fit into the smoke detector battery housing, the reachable battery housing comprising a reachable battery housing first terminal, a reachable battery housing second terminal, and a structure mechanically housing the reachable battery housing terminals;
wherein said first wire is either mechanically connected or designed to be mechanically connected to the first terminal of the reachable battery housing;
wherein said second wire is either mechanically connected or designed to be mechanically connected to the second terminal of the reachable battery housing;
wherein each one of said first wire and said second wire is at least two feet long. The wiring is sufficiently long to extend through or along the ceiling and walls from a location at which a smoke detector is mounted to a location along the walls which is within reach of the average human being. Typically, the type of battery used in smoke detectors is a standard 9 volt battery.

The design details of the faux battery are limited to those structure that would maintain contact to both terminals in the battery housing of the smoke detector, when replacing an actual battery in the battery housing of the smoke detector.

A preferred embodiment includes placing a faux 9 volt battery into the smoke detector battery housing (also called a compartment) that has positive and a negative wires attached and which each wire being 8 to 12 feet long, and which wires connect to a wall mounted reachable battery housing (also called a battery box) and placing a real 9 volt battery in the wall mounted battery box in order to provide power or backup power to the smoke detector.

Placing the battery in a wall mounted reachable battery housing makes replacing the battery more convenient.

While smoke detectors normally take a standard 9 volt battery, they could take some other dimension battery. Or, they could take plural batteries, for example a sequence of 6 double A batteries connected in series. Therefore, my invention more broadly requires only a smoke detector designed to have a battery installed in a battery compartment therein, in which the battery compartment has positive and negative electrical terminals therein, a faux battery and positive and negative electrical wire attached to the faux battery, in which the faux battery and positive and negative electrical wire are designed so that the placement of the faux battery in the battery compartment of the smoke detector connects the positive and negative electrical wires to the positive and negative electrical terminals in the battery compartment, a wall mountable box (that is a box designed to be mounted on an interior wall of a building such as a wall made from drywall or drywall and studs) that will hold a battery of the type designed to power the smoke detector (typically a normal 9 volt battery), in which the box is connectable to (or connected to) the positive and negative electrical wires so that installation of the battery in the wall mountable box will provide the battery power via the positive and negative electrical wire to the smoke detector, providing the same electrical power function as if the battery were placed in the battery compartment of the smoke detector instead of the faux battery. By "faux" I mean an imitation or artificial, that is, something designed to replace the battery that is not in fact a battery. The positive and negative electrical wire consists of a positive line and a negative line, each line comprising conductive material and each line conductively isolated from the other line so that the battery will not short circuit. The positive and negative electrical wire includes electrical insulation. The positive and negative electrical wire can extend within the room or behind the wall, from the smoke detector to the wall mountable box.

The wall mountable box may include a sense circuit that senses for short circuits, an alarm to alarm when a short circuit is sensed, and active circuitry to block current flow when a short circuit is sensed.

The wall mountable box may include a sense circuit that senses for irregular response from the smoke detector, such as open circuits, irregular or excess current draw, an alarm to alarm when irregular or excess current draw is sensed, and active circuitry to block and/ore meter current flow when irregular or excess current draw sensed. Alarms can be audio, visual, or wireless transmissions.

The wall mountable box may include smart wireless technology to report status of the battery wirelessly to other devices, such as a house monitoring system.

The wall mountable box may include a ground post or connection feature to allow a metal case of the wall mountable box to be grounded to house ground.

The wall mountable box may include a connections for house or building power, or DC power, to power active electronics in the wall mountable box. The mountable box may include or be connected to an AC to DC transformer to transform wall power (110 or 220 V AC for example) to DC power to power active electronics in the wall mountable box.

Preferably, the reachable wall battery housing is between 2 and 6 feet above a surface of a floor of the room.

Preferably, reachable battery housing covers the battery so that the battery is not exposed to the room. However, the reachable battery housing may be partially open, so long as the reachable battery housing secures the battery so that the battery remains electrically connected to terminals of the reachable battery housing.

The wires connecting the faux battery to the reachable battery housing may be terminated with snap or press fit connectors designed to snap or press against corresponding connectors of the faux battery and reachable battery housing. However, the wires connecting the faux battery to the reachable battery housing may be pinned, screwed, solders, or welded to one or both of the faux battery and reachable battery housing.

In all instances the wires extend out of the smoke detector housing, and the smoke detector and the reachable battery housing are not mechanically connected to one another, except via their mounting to the wall and/or ceiling. In this regard, the smoke detector may be mounted to either a wall or the ceiling, but the reachable battery housing is always mounted to a wall at a height above the wall within reach of an average human being.

Preferably, after installing a battery in the reachable battery housing, the installer should press the test button on the bottom side of the smoke detector to ensure the battery is providing power to the smoke detector.

DETAILED DESCRIPTION OF THE FIGURES

Figure 1:
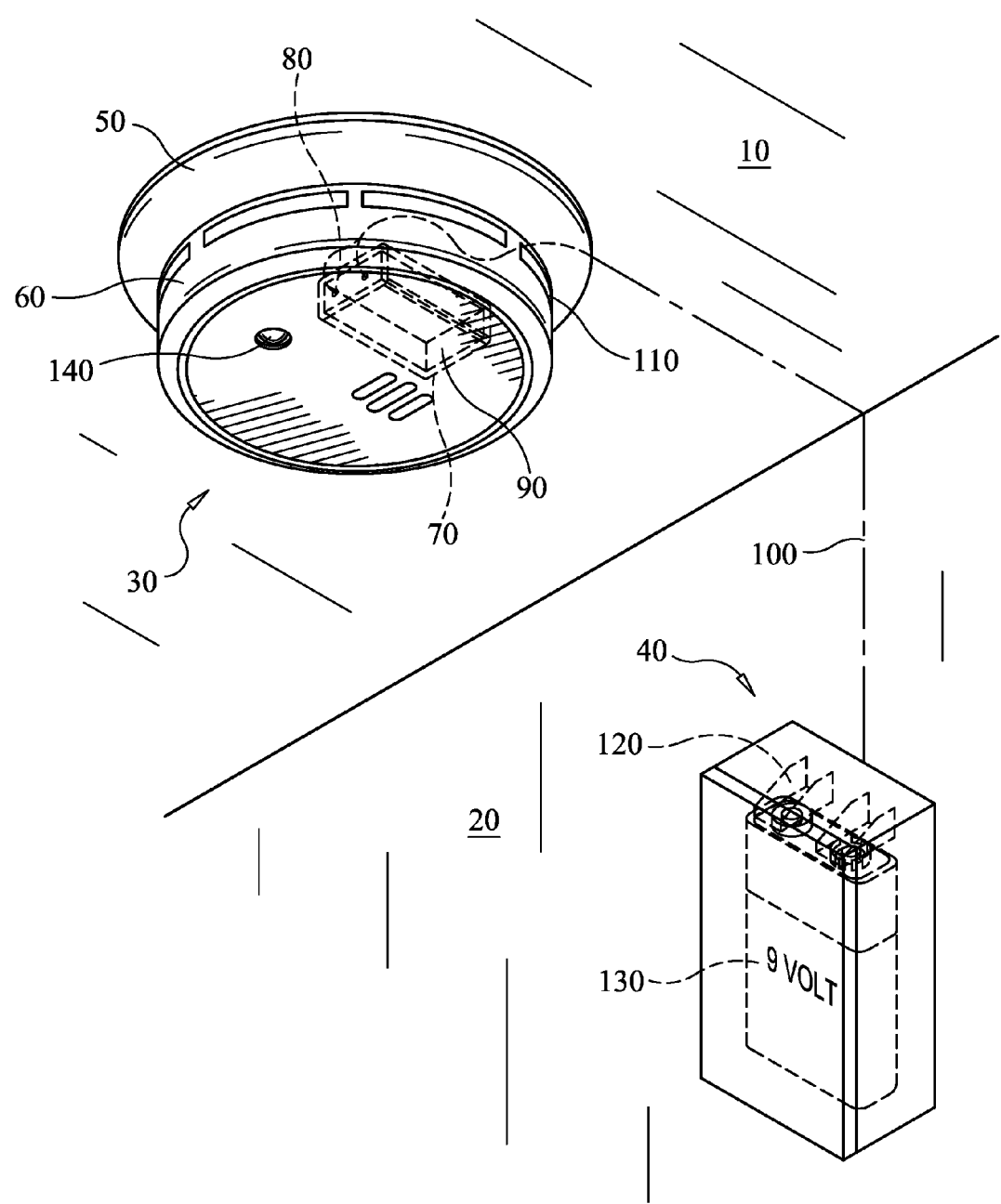
FIG. 1 is a perspective view of a novel smoke detector ceiling installation showing an embodiment of the invention.

FIG. 1 shows part of a room defined by ceiling 10 and wall 20, smoke detector 30 mounted to ceiling 10; reachable battery housing 40 mounted to wall 20; and a positive and negative wire pair 50 extending to smoke detector 30 and battery housing 40. Smoke detector 30 comprises a ceiling mount plate 50 and a connecting lid 60 that connects to ceiling mount plate 50, typically by rotation. Smoke detector test button 140 is exposed in lid 60. Pressing this button indicates wither the battery is providing power to the smoke detector. Smoke detector functions by generating a loud noise when it detects smoke. This is a conventional smoke detector.

Smoke detector 30 also defines an smoke detector battery housing 70 internal between ceiling mount plate 50 and lid 60 in which two smoke detector battery terminals 80 reside. Faux battery 90 resides in housing 70. Faux battery 90 is designed go conductively couple a pair of wires 100 to smoke detector battery terminals 80. Conventional smoke detectors have apertures 110 somewhere along ceiling mounting plate 50 and lid 60. Wires 100 extend through such an aperture. Staple or hook or the like mount secures wire 100 along ceiling 10 and wall 20, from smoke detector 30 to reachable battery housing 40. Wires 100 conductively connect to terminals 120, so that DC current from battery 130 can flow to smoke detector battery terminals 80, to power smoke detector 30 as needed.

Faux battery 80 contains no electrochemical cell. Instead, it is a structure designed to connect to the battery terminals of the smoke detector.

For the conventional linear cell battery, the terminals of the battery are at opposite ends from one another and do not include structure suitable for latching on to. These batteries require corresponding battery contact terminals spaced apart and held fixed relative to on another, so that the battery can be pressure fit between the battery contact terminals to make electrical and be mechanically secured between the battery contact terminals. A faux battery replacing such a conventional linear cell battery requires a structure that can be secured in place by pressure fit between battery contact terminals held spaced apart from one another.

Figure 2:
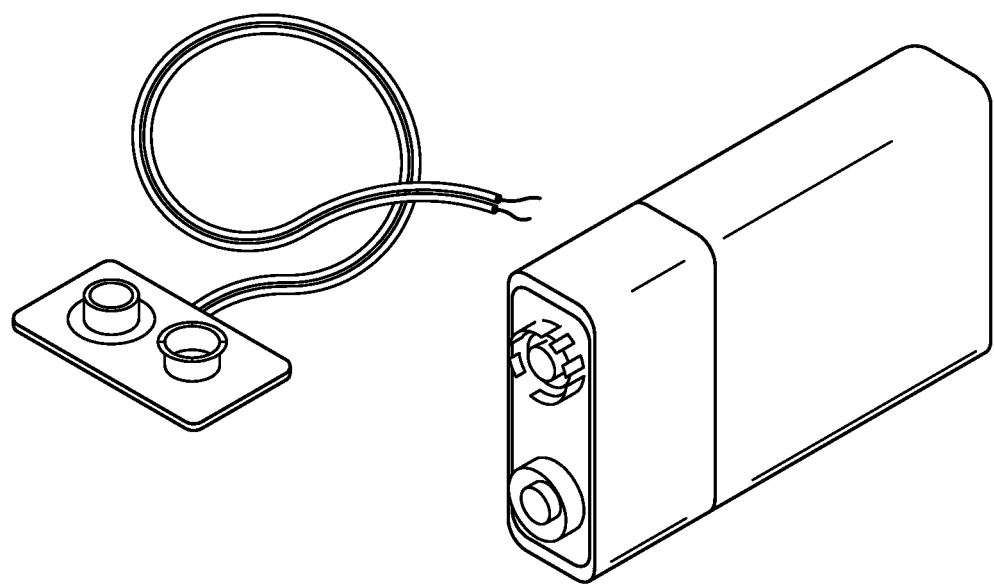
FIG. 2 shows types of 9 volt battery snap fit terminals and a 9 volt battery.
Figure 3:
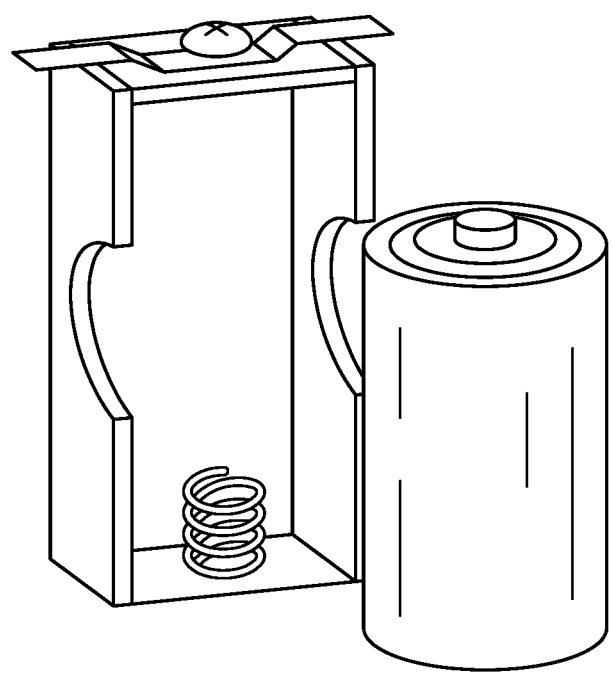
FIG. 3 shows a conventional linear cell 1.5 volt battery and corresponding battery terminal contact structure.

For the 9 volt battery showing in FIG. 2, pressure forcing this kind of battery toward each terminal of the snap fit terminal latches the battery terminal and terminal to one another. For this kind of battery, a snap fit terminal is a 9 volt faux battery because such a snap fit terminal can connect to another snap fit terminal forming part of a smoke detector. Alternatively, additional structure can be mechanically connected to the faux battery terminals, for example for ease of handling or to have the same size and shape of the battery the faux battery is replacing, to indicate to an installer which type of battery the faux battery should replace.

The wires may be run from the smoke detector behind the wall and above the ceiling or on the room side of the wall and ceiling. Wall mounting may be by screws, nails, tape, or the like. Double side foam stick tape is preferred.

FURTHER DESCRIPTION AND USAGE INSTRUCTIONS

The negative wire is done in the same manor to complete the circuit through a negative terminal connection. A Faux battery with a plus and a minus 9 volt battery terminal with a red 24 gage wire attached to the positive side terminal and a black 24 gage wire attached to the negative side terminal. Both red and black wires supplied a 12 foot lengths molded together, i.e. zip cord that can be cut to required length with common house hold scissors. The zip cord attaches to the 9 volt wall mounted battery box supplied in the kit. Assuming your current Smoke detector is mounted to local codes, you will first remove the current 9 volt battery and discard as per your local requirements. (Please make sure to cover both terminals with electrical tape to prevent a short that could cause a fire.) Next install FAUX 9 volt battery supplied with the kit by locating an opening in the smoke detector at the opposite end of the terminals and thread the full length of zip cord. Do not use the battery door to thread zip cord as this will not allow the door to close properly and unit will not function. Once you have the full length pulled through then you will need some tape to temporally secure the zip cord to the wall, use only a painters, scotch or electrical type tape for this operation, other tapes with strong glue may damage the surface of the wall, i.e. standard masking or duct tapes. Locate your box and make sure you have at a minimum six inches of red & black zip cord past the bottom of your box location, this will allow extra wire for the connection. You may have more then six inches depending on your desired location for your convenience. However, do not cut until instructed. On the back side of the kits battery box you will find two 3M glue strips, remove the liner from both strips and install at your selected location, making sure to maintain a minimum of 6 inches below the bottom of the box. When mounting, be sure not to have the wire between the box and the mounting surface this will not allow for proper connection. Now that you have mounted the box, thread the zip cord through the hole locates in the top of the box and pull remaining wire through completely. Now your next step is to use the 3M clear mini clips (8) and tape supplied to secure zip cord to the wall and ceiling as required, starting at the detector and working back to the box maintaining a secure wire. Now it is time to connect the internal wires to the box, by sliding the red wire into the red connecter and snapping shut and trimming the excess wire with scissors and following the same instructions with the black wire. After making sure everything is correctly mounted, the FAUX battery is installed with the plus and minus connectors in the right location and the defectors door is closed completely you are ready to install a new 9 volt battery, in the new wall mounted box. Test your system as per MFG instructions to verify good connections, if not recheck connections. Follow MFG instructions for battery maintenance for yearly replacement. Congratulations you now have an ADA safe smoke/fire detector. Replace all your homes detectors with one today.

The invention claimed is:

1. A combination of interrelated parts, comprising:
   (1) a faux battery;
   (2) a first wire;
   (3) a second wire;
   wherein the first wire is mechanically connected or designed to be mechanically connected to the faux battery;
   wherein the second wire is mechanically connected or designed to be mechanically connected to the faux battery;
   wherein the faux battery is designed to fit into a smoke detector battery housing inside of a smoke detector housing, instead of a battery for which the smoke detector battery housing is designed, such that, (a) the first wire is conductively connected to a first terminal of the smoke detector battery housing when the first wire is mechanically connected to the faux battery and (b) the second wire is conductively connected to a second terminal of the smoke detector battery housing when the second wire is mechanically connected to the faux battery;
   (4) a reachable battery housing designed to connect to a battery designed to fit into the smoke detector battery housing, the reachable battery housing comprising a reachable battery housing first terminal, a reachable battery housing second terminal, and a structure mechanically housing the reachable battery housing terminals;
   wherein said first wire is either mechanically connected or designed to be mechanically connected to the first terminal of the reachable battery housing;
   wherein said second wire is either mechanically connected or designed to be mechanically connected to the second terminal of the reachable battery housing;
   wherein each one of said first wire and said second wire is at least two feet long.

2. The combination of claim 1 wherein said first wire and said second wire connect said faux battery to said reachable housing.

3. The combination of claim 1 wherein said reachable housing is installed on a wall of a room not more than 6 feet above a floor of the room.

4. The combination of claim 1 wherein said faux batter comprises a snap fit for a 9 volt battery.

5. The combination of claim 1 wherein said first wire, said second wire, said faux battery are mechanically connected to said reachable battery housing and to said smoke detector.

6. The combination of claim 2 wherein the electrical wire comprises two paths, one physically connection a positive lead of the battery compartment in the smoke detector to a positive terminal in the wall mount box, which positive terminal in the wall mount box is conductively coupled to the positive lead for connecting a positive terminal of a battery.

7. A combination comprising:
   a smoke detector designed to detect smoke and sound an alarm, send an alarm signal, or both, when smoke is detected, in which the smoke detector comprises a battery compartment for holding a battery capable of powering said smoke detector;
   wherein the battery compartment comprises positive and negative electrical terminals designed for contacting to terminals of a battery;
   a faux battery and positive and negative electrical wire attached to the faux battery;
   wherein the faux battery and positive and negative electrical wire are designed so that the placement of the faux battery in the battery compartment of the smoke detector connects the positive and negative electrical wires to the positive and negative electrical terminals in the battery compartment;
   a wall mountable box designed to be mounted on an interior wall of a building that will hold a battery of the type designed to power the smoke detector, in which the box is either connectable to or connected to the positive and negative electrical wires so that installation of the battery in the wall mountable box will provide the battery power via the positive and negative electrical wire to the smoke detector, when the positive and negative electrical wires are connected to the wall mountable box and the faux battery is mounted in the battery compartment of the smoke detector; and wherein the positive and negative electrical wire comprises two electrically isolated conductive extensions, electrical insulation, and the two electrically isolated conductive extensions are conductively insulated from one another by the electrical insulation.

\* \* \* \* \*